United States Patent
Yasugi

(10) Patent No.: US 8,395,272 B2
(45) Date of Patent: Mar. 12, 2013

(54) WIND-POWER-STATION CONTROL APPARATUS AND WIND-POWER-STATION CONTROL METHOD

(75) Inventor: Akira Yasugi, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/291,439

(22) Filed: Nov. 8, 2011

(65) Prior Publication Data

US 2012/0133132 A1 May 31, 2012

Related U.S. Application Data

(63) Continuation of application No. PCT/JP2011/068266, filed on Aug. 10, 2011.

(51) Int. Cl.
*H02P 9/04* (2006.01)
(52) U.S. Cl. .................................. 290/44; 290/55
(58) Field of Classification Search ............ 290/44, 290/55
See application file for complete search history.

(56) References Cited

U.S. PATENT DOCUMENTS

| | | | |
|---|---|---|---|
| 2009/0261589 A1* | 10/2009 | Oohara et al. | 290/44 |
| 2010/0078940 A1 | 4/2010 | Kondo et al. | |
| 2011/0031748 A1 | 2/2011 | Arinaga et al. | |
| 2011/0046803 A1 | 2/2011 | Kondo et al. | |
| 2011/0166717 A1* | 7/2011 | Yasugi | 290/44 |
| 2012/0104755 A1* | 5/2012 | Hashimoto et al. | 290/44 |

FOREIGN PATENT DOCUMENTS

| | | |
|---|---|---|
| JP | 6117353 | 4/1994 |
| JP | 10339259 A | 12/1998 |
| JP | 11082282 A | 3/1999 |
| JP | 2000069797 | 3/2000 |
| JP | 2000-166096 A | 6/2000 |
| JP | 2000166096 A | 6/2000 |
| JP | 2003343416 A | 12/2003 |
| JP | 2007032488 | 2/2007 |
| JP | 2009-303355 A | 12/2009 |
| JP | 2009303355 A | 12/2009 |
| JP | 2010-84545 A | 4/2010 |
| JP | 2010084545 A | 4/2010 |
| JP | 2011038498 | 2/2011 |
| WO | 2011016278 A1 | 2/2011 |

OTHER PUBLICATIONS

Japanese Office Action for Application No. 2011-554309 mailed Feb. 28, 2012.
International Search Report of PCT/JP2011/068266 dated Nov. 15, 2011.
A Japanese Decision to Grant, issued Jun. 5, 2012 in Japanese Application No. 2011-554309.

* cited by examiner

*Primary Examiner* — Tho D Ta
(74) *Attorney, Agent, or Firm* — Kanesaka Berner & Partners, LLP

(57) ABSTRACT

A wind-power-station control apparatus is provided in a wind power station having a plurality of wind turbine generators. To reduce the electrical power supplied from the wind power station to the utility grid, the wind-power-station control apparatus performs, for a wind turbine generator whose actual output electrical power is small relative to the maximum electrical power that can be output, among the plurality of wind turbine generators, output-power reduction control for reducing the output power thereof and increasing the rotational speed of the rotor thereof. Thus, even when control for reducing the output power is performed for the wind turbine generator, it is possible to suppress waste of the wind energy received by the blades and to increase the total annual amount of generated electrical power.

7 Claims, 6 Drawing Sheets

WIND-POWER-STATION CONTROL APPARATUS AND WIND-POWER-STATION CONTROL METHOD

CROSS REFERENCE TO RELATED APPLICATIONS

This is a continuation of International Application PCT/JP2011/068266, with an international filing date of Aug. 10, 2011, which is hereby incorporated by reference herein in its entirety.

TECHNICAL FIELD

The present invention relates to a wind-power-station control apparatus and a wind-power-station control method.

BACKGROUND ART

In recent years, wind power stations that are each constituted by a plurality of wind turbine generators and send electrical power to the utility grid, so-called wind farms, are becoming widespread.

A wind power station needs to send electrical power to the utility grid such that the utility grid does not become unstable, and needs to reduce the electrical power supplied from the wind power station to the utility grid when the supply of electrical power from the wind power station to the utility grid becomes excessive.

PTL 1 discloses a system for preferentially reducing the output power of a wind turbine generator whose output power is the highest when the total output power of a plurality of wind turbine generators exceeds a predetermined amount.

Furthermore, PTLs 2 and 3 disclose wind-turbine-generator control methods in which, when the supply of electrical power becomes excessive, the rotational speed of the rotor having blades is increased to store rotational energy (inertial energy).

CITATION LIST

Patent Literature

{PTL 1} Japanese Unexamined Patent Application, Publication No. 2003-343416
{PTL 2} Japanese Unexamined Patent Application, Publication No. Hei 10-339259
{PTL 3} Japanese Unexamined Patent Application, Publication No. Hei 11-82282

SUMMARY OF INVENTION

Technical Problem

However, for a wind turbine generator that is operating at the rated output power, it is necessary to control the pitch angles of the blades to be set to the feather side in order to reduce the output power; in other words, it is necessary to narrow down the pitch angles, thereby wasting the wind energy corresponding thereto.

Furthermore, as described in PTLs 2 and 3, when the rotational speed of the rotor is increased, in some cases, the rotational speed of the rotor reaches the rated rotational speed. In those cases, in order to reduce the rotational speed of the rotor to the rated rotational speed or lower, it is also necessary to control the pitch angles of the blades so as to be set to the feather side to waste wind energy.

The wind turbine generator for which such control is performed has a problem in that part of wind energy that can normally be converted into electrical power is wasted without being stored as inertial energy of the rotor.

The present invention has been made in view of the above-described circumstances, and an object thereof is to provide a wind-power-station control apparatus and a wind-power-station control method for suppressing the wastage of wind energy received by the blades even when control for reducing the output power of a wind turbine generator is performed and for increasing the total annual amount of generated electrical power.

Solution to Problem

According to a first aspect, the present invention provides a control apparatus for a wind power station having a plurality of wind turbine generators, the control apparatus performing, for a wind turbine generator whose actual output electrical power is relatively small with respect to the maximum electrical power that can be output, among the plurality of wind turbine generators, control for reducing the output power thereof and increasing the rotational speed of a rotor thereof, in order to reduce electrical power supplied from the wind power station to a utility grid.

According to the above-described configuration, the wind power station has a plurality of wind turbine generators.

When the supply of electrical power from the wind power station to the utility grid becomes excessive, it is necessary to reduce the electrical power supplied from the wind power station to the utility grid. In this case, for example, it is considered that an output-power reduction value is determined for each of the wind turbine generators in proportion to the output power (electrical power) of each of the wind turbine generators. When the output power of the wind turbine generator is reduced, excess energy that was not used for power generation increases the rotational speed of the rotor, thereby increasing the inertial energy of the rotor.

However, when the output power of the wind turbine generator is reduced, an increased rotational speed of the rotor reaches the rated rotational speed, in some cases. In those cases, in order to reduce the rotational speed of the rotor to the rated rotational speed or lower, it is necessary to control the pitch angles of the blades so as to be set to the feather side to reduce the wind to be received by the blades. In the wind turbine generator for which such control is performed, part of the wind energy that can normally be converted into electrical power is wasted without being stored as inertial energy of the rotor.

On the other hand, in the wind turbine generator whose actual output electrical power is small relative to the maximum electrical power that can be output, the rotational speed of the rotor has a large margin before reaching the rated rotational speed. Specifically, in this wind turbine generator, it is possible to store more of the wind energy received by the blades as inertial energy of the rotor, without being wasted. The inertial energy stored in the rotor is converted into electrical power by the generator when the necessity to reduce the electrical power supplied from the wind power station to the utility grid is cancelled.

Therefore, to reduce the electrical power supplied from the wind power station to the utility grid, control for reducing the output power and increasing the rotational speed of the rotor is performed for a wind turbine generator whose actual output electrical power is relatively small with respect to the maximum electrical power that can be output, among the plurality of wind turbine generators. Increasing the rotational speed of the rotor means that wind energy that was not used for power generation is converted into the rotational energy of the blades and is stored, as described above.

Therefore, with this configuration, even when control for reducing the output power of the wind turbine generator is performed, it is possible to suppress waste of the wind energy received by the blades and to increase the total annual amount of generated electrical power.

In the above-described first aspect, it is preferable to include: a potentially-available-inertial-energy calculating unit for calculating potentially-available inertial energy, which is inertial energy that can be stored by further increasing the rotational speed of the rotor, for each of the wind turbine generators based on operating information indicating an operational status of each of the wind turbine generators; and an output-power-reduction-value calculating unit for calculating an output-power reduction value for each of the wind turbine generators such that the output-power reduction value for each of the wind turbine generators increases as the potentially-available inertial energy calculated by the potentially-available-inertial-energy calculating unit increases.

According to the above-described configuration, the potentially-available-inertial-energy calculating unit calculates, for each of the wind turbine generators, potentially-available inertial energy, which is inertial energy that can be stored by further increasing the rotational speed of the rotor, based on the operating information indicating the operational status of the wind turbine generator. Note that the inertial energy is calculated based on the value obtained by subtracting the rotational speed of the rotor during the operation of the wind turbine generator from a predetermined maximum rotational speed of the rotor.

Then, the output-power-reduction-value calculating unit calculates the output-power reduction value for each of the wind turbine generators such that the output-power reduction value for the wind turbine generator increases as the potentially-available inertial energy increases.

As described above, with the above-described configuration, the potentially-available inertial energy is calculated, and the output-power reduction value for the wind turbine generator is increased as the potentially-available inertial energy increases; therefore, it is possible to perform the control for reducing the output power of the wind turbine generator with a higher degree of accuracy.

In the above-described first aspect, it is preferable that the output-power-reduction-value calculating unit calculate the output-power reduction value for each of the wind turbine generators by prorating a reduction value for the electrical power supplied to the utility grid, based on the potentially-available inertial energy for each of the wind turbine generators.

According to the above-described configuration, the output-power reduction value for each of the wind turbine generators is calculated by prorating the reduction value for the electrical power supplied to the utility grid based on the potentially-available inertial energy of each of the wind turbine generators; therefore, the output-power reduction value for each of the wind turbine generators can be easily calculated.

In the above-described first aspect, it is preferable that the output-power-reduction-value calculating unit derive the number of wind turbine generators whose output power is to be reduced, based on the reduction value for electrical power supplied to the utility grid; calculate, for each of the derived number of wind turbine generators, the output-power reduction value for each of the wind turbine generators such that the output-power reduction value for each of the wind turbine generators increases as the potentially-available inertial energy increases; and make the derived number of wind turbine generators reduce the output power thereof and increase the rotational speeds of the rotors thereof.

According to the above-described configuration, for example, if the reduction value for the electrical power supplied to the utility grid is large, the control for reducing the output power is performed for relatively more of the wind turbine generators. On the other hand, if the reduction value for the electrical power supplied to the utility grid is small, the control for reducing the output power is performed for relatively few of the wind turbine generators.

Therefore, with the above-described configuration, since the output-power reduction control is not always performed for all the wind turbine generators, the output-power reduction control can be performed efficiently.

In the above-described first aspect, it is preferable that the output-power-reduction-value calculating unit select, from the plurality of wind turbine generators, a wind turbine generator for which it is expected that received wind energy will decrease; calculate the output-power reduction value for the selected wind turbine generator such that the output-power reduction value for the wind turbine generator increases as the potentially-available inertial energy increases; and make the selected wind turbine generator reduce the output power thereof and increase the rotational speed of the rotor thereof.

According to the above-described configuration, even when the control for reducing the output power is performed for the wind turbine generator for which it is expected that received wind energy will decrease, an increase in the rotational speed of the rotor thereof is small, and it is unlikely that the rotational speed of the rotor will reach the rated rotational speed; therefore, waste of the wind energy can be better suppressed.

According to a second aspect, the present invention provides a control method for a wind power station having a plurality of wind turbine generators, the control method including the steps of: reducing the output power of a wind turbine generator whose actual output electrical power is relatively small with respect to the maximum electrical power that can be output, among the plurality of wind turbine generators; and increasing the rotational speed of a rotor thereof, to reduce electrical power supplied from the wind power station to a utility grid.

Advantageous Effects of Invention

According to the present invention, a beneficial effect is afforded in that it is possible to suppress waste of the wind energy received by the blades even when the control for reducing the output power of the wind turbine generator is performed and to increase the total annual amount of generated electrical power.

DESCRIPTION OF EMBODIMENTS

An embodiment of the present invention will be described below.

Figure 1:
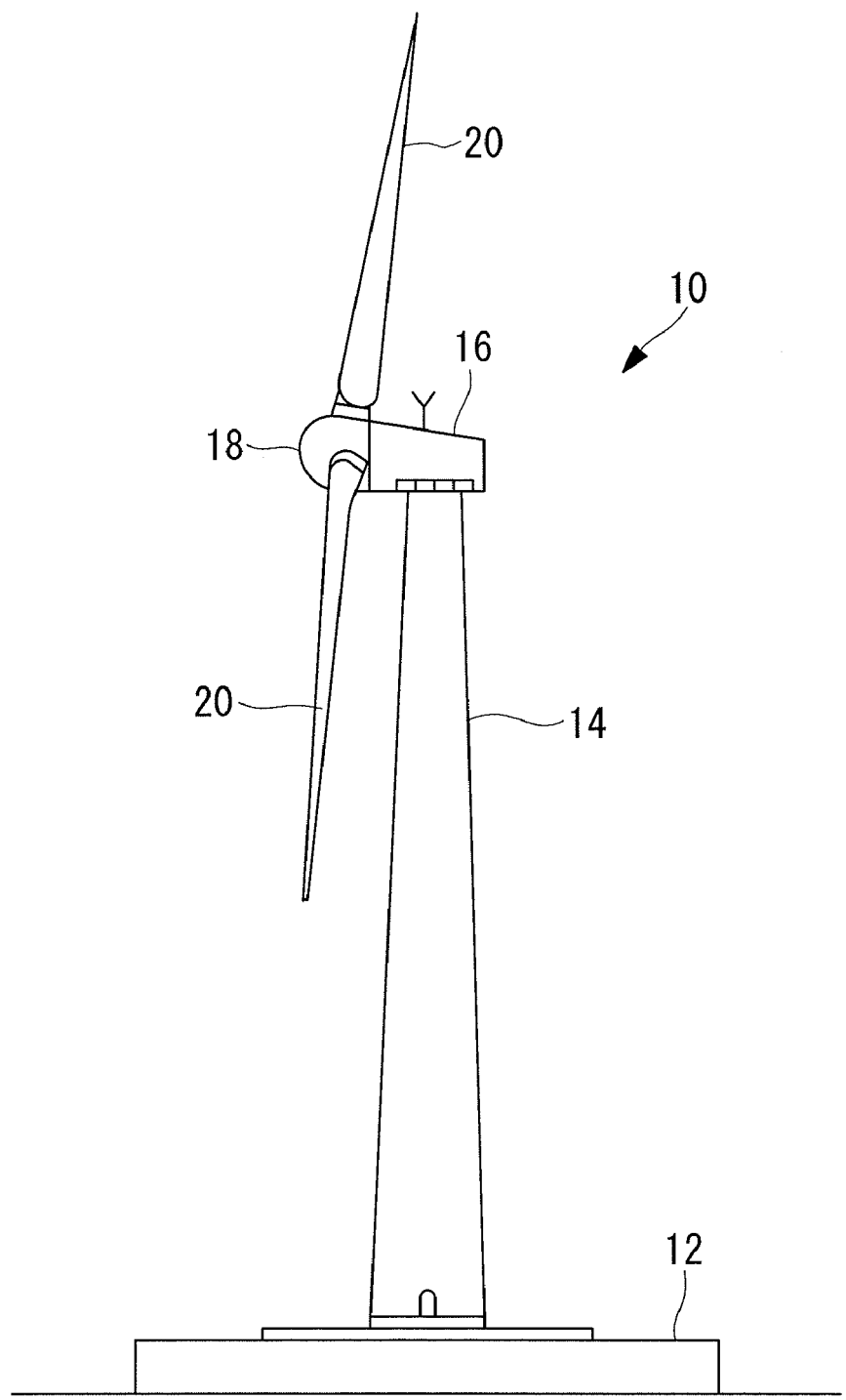
FIG. 1 is an external view of a wind turbine generator according to an embodiment of the present invention.

FIG. 1 is an external view of a wind turbine generator 10 according to this embodiment.

The wind turbine generator 10 shown in FIG. 1 has a tower 14 provided upright on a foundation 12, a nacelle 16 provided on the top of the tower 14, and a rotor 18 provided on the nacelle 16 so as to be able to rotate about a substantially horizontal axis.

A plurality of (in this embodiment, for example, three) blades 20 are attached to the rotor 18 radially from the rotational axis of the rotor 18. With this structure, a wind force striking against the blades 20 from the direction of the rotational axis of the rotor 18 is converted to mechanical power for rotating the rotor 18 about the rotational axis, and the mechanical power is converted to electrical power by a generator. Note that the blades 20 are coupled to the rotor 18 so as to be able to rotate with respect to the wind direction, and the pitch angles of the blades 20 can be changed. Note that the generator of this embodiment is an induction generator, and the output power thereof can be controlled.

Figure 2:
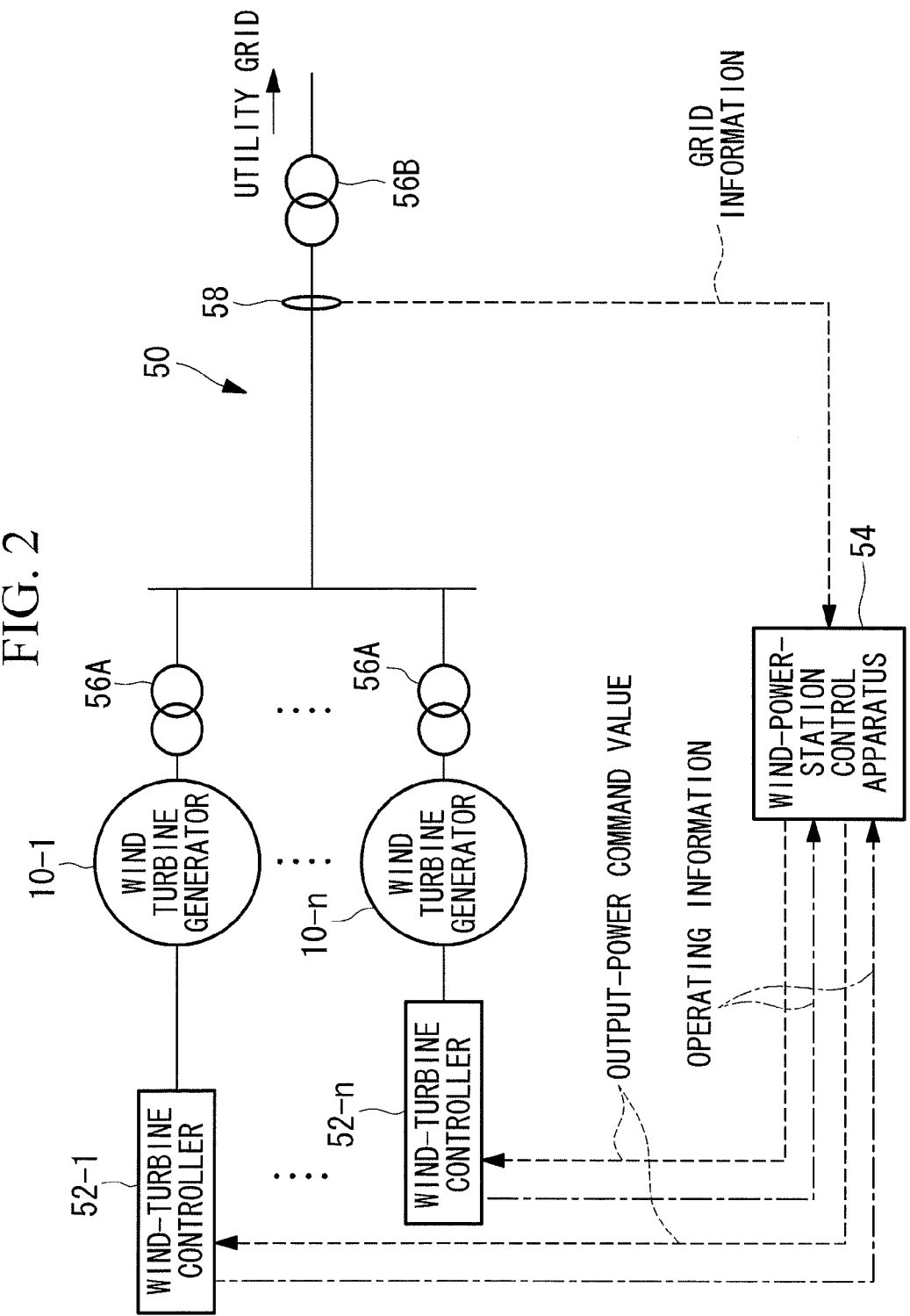
FIG. 2 is a configuration diagram of a wind power station according to the embodiment of the present invention.

FIG. 2 is a configuration diagram of a wind power station 50 (wind farm) according to this embodiment.

The wind power station 50 includes a plurality of wind turbine generators 10 (n wind turbine generators 10; hereinafter, n serves as a number for identifying a corresponding wind turbine generator 10), wind-turbine controllers 52 provided respectively for the wind turbine generators 10 to control the corresponding wind turbine generators 10, and a wind-power-station control apparatus 54 that conducts control for the respective wind turbine generators 10.

The respective wind turbine generators 10 are electrically connected to each other via transformers 56A and are further connected to a utility grid via a transformer 56B so as to be able to supply electrical power to the utility grid.

The wind-power-station control apparatus 54 sends to and receives from the wind-turbine controllers 52 various data used to control the wind turbine generators 10. Specifically, the wind-power-station control apparatus 54 obtains, from a interconnection point 58, grid information indicating the electrical power supplied from the wind power station 50 to the utility grid and the frequency of the utility grid (hereinafter, referred to as "grid frequency") and receives, from each of the wind-turbine controllers 52, operating information indicating the rotational speed of the rotor 18 and the pitch angles of the blades 20 in the corresponding wind turbine generator 10. The wind-power-station control apparatus 54 sends to each of the wind-turbine controllers 52 an output-power command value indicating electrical power to be output from the corresponding wind turbine generator 10.

When the output-power command value is received from the wind-power-station control apparatus 54, each of the wind-turbine controllers 52 controls the corresponding wind turbine generator 10 based on the output-power command value.

When the electrical power demanded from the utility grid is reduced, specifically, when the supply of electrical power from the wind power station 50 to the utility grid becomes excessive, it is necessary to reduce the electrical power supplied from the wind power station 50 to the utility grid.

An example conventional output-power reduction control for reducing the electrical power supplied from the wind power station 50 to the utility grid will be described with reference to FIG. 3.

Figure 3:
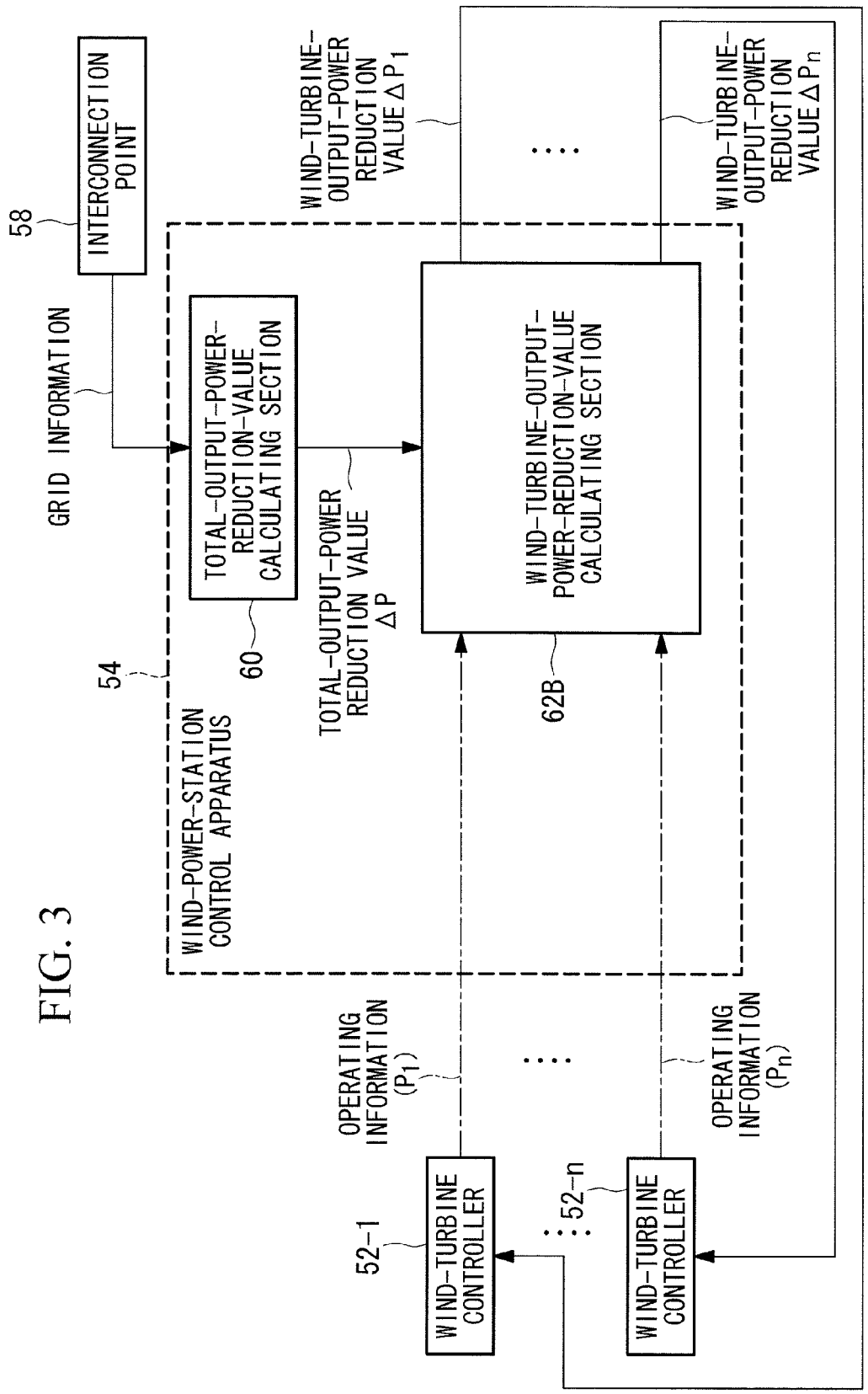
FIG. 3 is a functional block diagram for output-power reduction control performed by a conventional wind-power-station control apparatus.

As shown in FIG. 3, the wind-power-station control apparatus 54 includes a total-output-power-reduction-value calculating section 60 and a wind-turbine-output-power-reduction-value calculating section 62B.

The total-output-power-reduction-value calculating section 60 detects a change in the grid frequency included in the grid information sent from the interconnection point 58. When the supply of electrical power from the wind power station 50 to the utility grid becomes excessive, the total-output-power-reduction-value calculating section 60 calculates a reduction value (hereinafter, referred to as a "total-output-power reduction value") $\Delta P$ for the electrical power supplied from the wind power station 50 to the utility grid, based on the change in the grid frequency.

The wind-turbine-output-power-reduction-value calculating section 62B calculates an output-power reduction value (hereinafter, referred to as a "wind-turbine-output-power reduction value") $\Delta P_n$ for each of the wind turbine generators 10 based on the total-output-power reduction value $\Delta P$ calculated by the total-output-power-reduction-value calculating section 60.

Thus, as shown in Formula (1), the wind-turbine-output-power-reduction-value calculating section 62B calculates the wind-turbine-output-power reduction value $\Delta P_n$ in proportion to the output power (electrical power) $P_n$ of each of the wind turbine generators 10, indicated by the received operating information of the corresponding wind turbine generator 10.

{Formula 1}

$$\Delta P_n = \frac{\Delta P \cdot P_n}{\sum_{i=1}^{n} P_i} \quad (1)$$

Then, the wind-turbine-output-power-reduction-value calculating section 62B sends, to each of the wind-turbine controllers 52, the calculated wind-turbine-output-power reduction value $\Delta P_n$ for the corresponding wind-turbine controller 52. The wind-turbine controller 52 reduces the output power of the generator of the corresponding wind turbine generator 10 based on the received output-power command value. Therefore, the rotational speed of the rotor 18 is increased due to energy that was not used for power generation, and the inertial energy of the rotor 18 is increased.

However, in the conventional output-power reduction control, the output is reduced randomly in proportion of the output power of the wind turbine generator 10; therefore, when the output power of the wind turbine generator 10 is reduced, an increased rotational speed of the rotor 18 reaches the rated rotational speed, in some cases. In those cases, in order to reduce the rotational speed of the rotor 18 to the rated rotational speed or lower, it is necessary to control the pitch angles of the blades 20 so as to be set to the feather side to reduce the wind to be received by the blades. In the wind turbine generator 10 for which such control is performed, part of the energy of the wind (hereinafter, referred to as "wind energy") that can normally be converted into electrical power is wasted without being stored as inertial energy of the rotor 18.

On the other hand, in the wind turbine generator 10 whose actual output electrical power is small relative to the maximum electrical power that can be output, the rotational speed of the rotor 18 has a large margin before reaching the rated rotational speed. Specifically, in this wind turbine generator 10, it is possible to store more of the wind energy received by the blades 20 as inertial energy of the rotor 18, without being wasted.

To reduce the electrical power supplied from the wind power station 50 to the utility grid, the wind-power-station control apparatus 54 of this embodiment performs, for a wind turbine generator 10 whose actual output electrical power is relatively small with respect to the maximum electrical power that can be output, among the plurality of wind turbine generators 10, control for reducing the output power thereof and increasing the rotational speed of the rotor 18 thereof.

Figure 4:
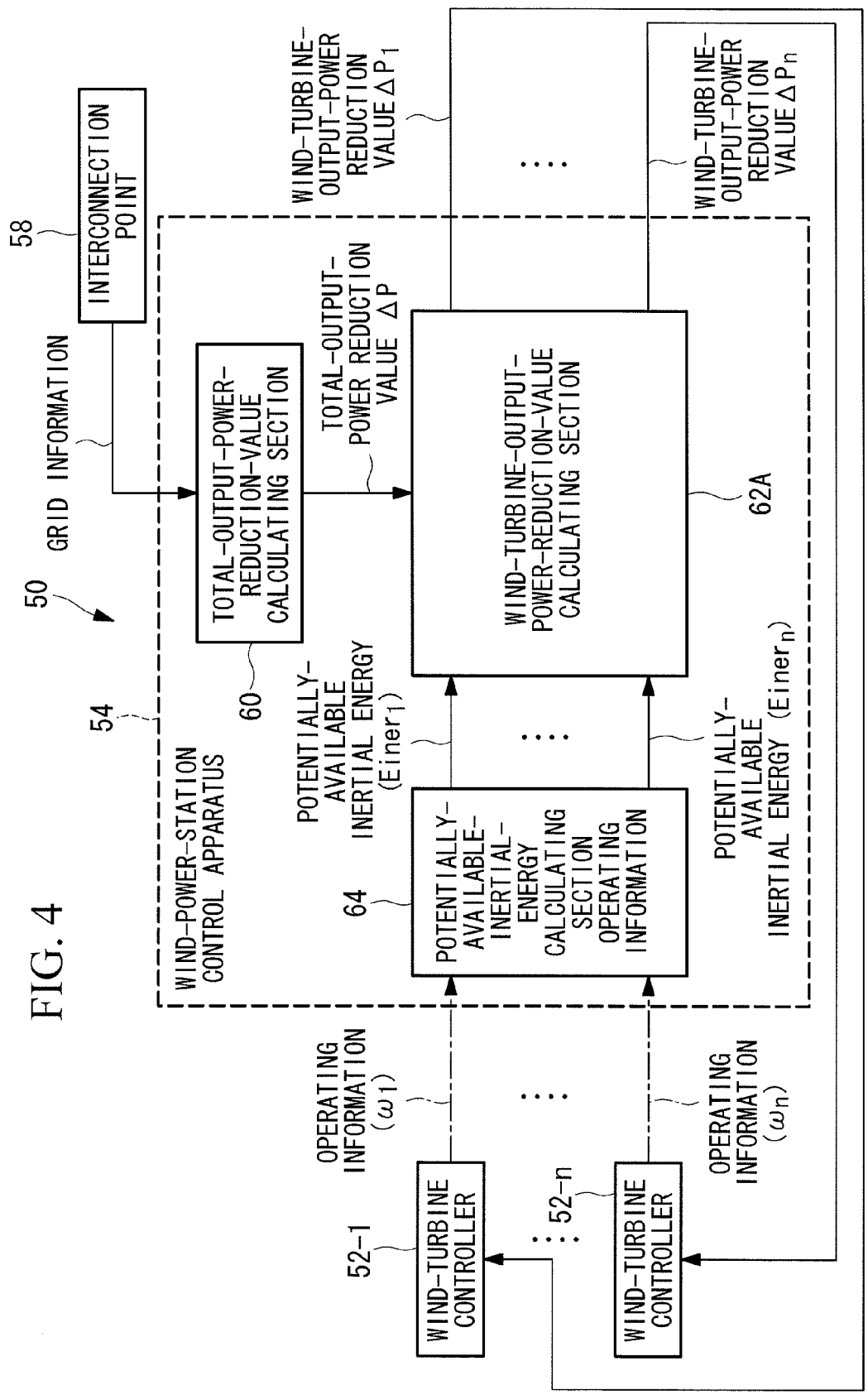
FIG. 4 is a functional block diagram for output-power reduction control performed by a wind-power-station control apparatus according to the embodiment of the present invention.

FIG. 4 is a functional block diagram for output-power reduction control performed by the wind-power-station control apparatus 54 of this embodiment.

As shown in FIG. 4, the wind-power-station control apparatus 54 includes the total-output-power-reduction-value calculating section 60, a potentially-available-inertial-energy calculating section 64, and a wind-turbine-output-power-reduction-value calculating section 62A.

The potentially-available-inertial-energy calculating section 64 calculates the potentially-available inertial energy of each of the wind turbine generators 10. The potentially-available inertial energy is the inertial energy that can be stored by further increasing the rotational speed of the rotor 18.

Specifically, the potentially-available inertial energy is expressed by Formula (2) where the potentially-available inertial energy of each wind turbine generator 10 is $Einer_n$, the inertia moment per rotation of the rotor 18 is J (kgm$^2$), a predetermined maximum rotational speed of the rotor 18 is $\omega_{lim}$, and the rotational speed of the rotor 18 during the operation of the wind turbine generator 10 is $\omega_n$.

{Formula 2}

$$Einer_n = \frac{1}{2} J(\omega_{lim}^2 - \omega_n^2) \quad (2)$$

The rated rotational speed used here is the rotational speed of the rotor 18 when the pitches of the blades 20 are set to full fine and the output power of the wind turbine generator 10 is the rated output power. Furthermore, the rotational speed $\omega_n$ of the rotor 18 can be obtained from the operating information received from the corresponding wind-turbine controller 52. The potentially-available-inertial-energy calculating section 64 may use, as the maximum rotational speed $\omega_{lim}$, a rotational speed lower than the rated rotational speed on the basis of the rated rotational speed of the rotor 18, instead of using the rated rotational speed.

It is understood from Formula (2) that the potentially-available inertial energy $Einer_n$ is based on the value obtained by subtracting the rotational speed $\omega_n$ of the rotor 18 during the operation of the wind turbine generator 10 from the maximum rotational speed $\omega_{lim}$ of the rotor 18. The potentially-available inertial energy increases as the rotational speed $\omega_n$ of the rotor 18 decreases. The potentially-available inertial energy $Einer_n$ is 0 (zero) when the rotor 18 is rotated at the maximum rotational speed $\omega_{lim}$. Specifically, among a plurality of wind turbine generators 10 having the same maximum output power, a wind turbine generator 10 whose output power is lower has larger potentially-available inertial energy $Einer_n$.

The wind-turbine-output-power-reduction-value calculating section 62A receives the potentially-available inertial energy $Einer_n$ of each of the wind turbine generators 10 calculated by the potentially-available-inertial-energy calculating section 64 and also receives the total-output-power reduction value ΔP calculated by the total-output-power-reduction-value calculating section 60. Then, the wind-turbine-output-power-reduction-value calculating section 62A calculates the wind-turbine-output-power reduction value $\Delta P_n$ for each of the wind turbine generators 10 such that the output-power reduction value for the wind turbine generator 10 increases as the potentially-available inertial energy $Einer_n$ increases.

More specifically, as shown in Formula (3), the wind-turbine-output-power reduction value $\Delta P_n$ is calculated by dividing the product of the potentially-available inertial energy $Einer_n$ of the wind turbine generators 10 and the total-output-power reduction values ΔP by the sum of the potentially-available inertial energy $Einer_n$, in other words, by prorating the total-output-power reduction value ΔP based on the potentially-available inertial energy $Einer_n$.

{Formula 3}

$$\Delta P_n = \frac{\Delta P \cdot Einer_n}{\sum_{i=1}^{n} Einer_i} \quad (3)$$

The wind-turbine-output-power-reduction-value calculating section 62A sends to each of the wind-turbine controllers 52 the calculated wind-turbine-output-power reduction value $\Delta P_n$ for the corresponding wind-turbine controller 52. The wind-turbine controller 52 controls the corresponding wind turbine generator 10 such that the output power of the generator thereof is reduced and the rotational speed of the rotor 18 thereof is further increased, for example, based on the received output-power command value. Since the load is lightened when control is performed so as to reduce the output power of the generator, the rotational speed of the rotor 18 is increased, and the wind energy can be stored as inertial energy.

FIG. 5 is a schematic diagram showing an advantage of the output-power reduction control according to this embodiment.

Figure 5A:
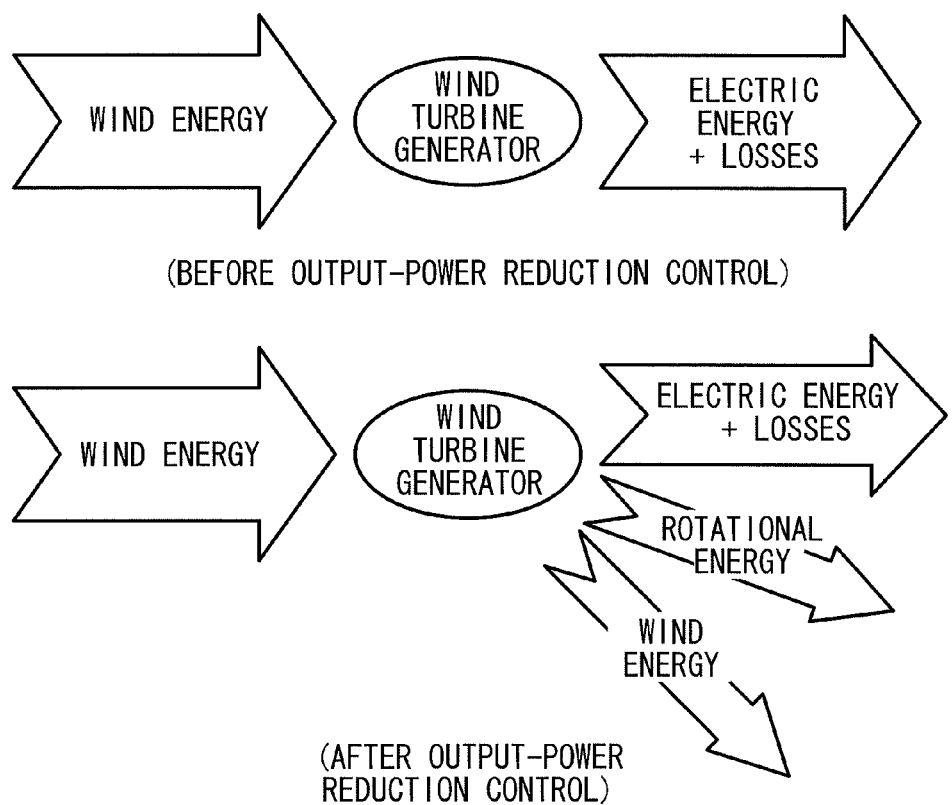
FIG. 5A shows conversion of wind energy performed by the wind turbine generator through conventional output-power reduction control.
Figure 5B:
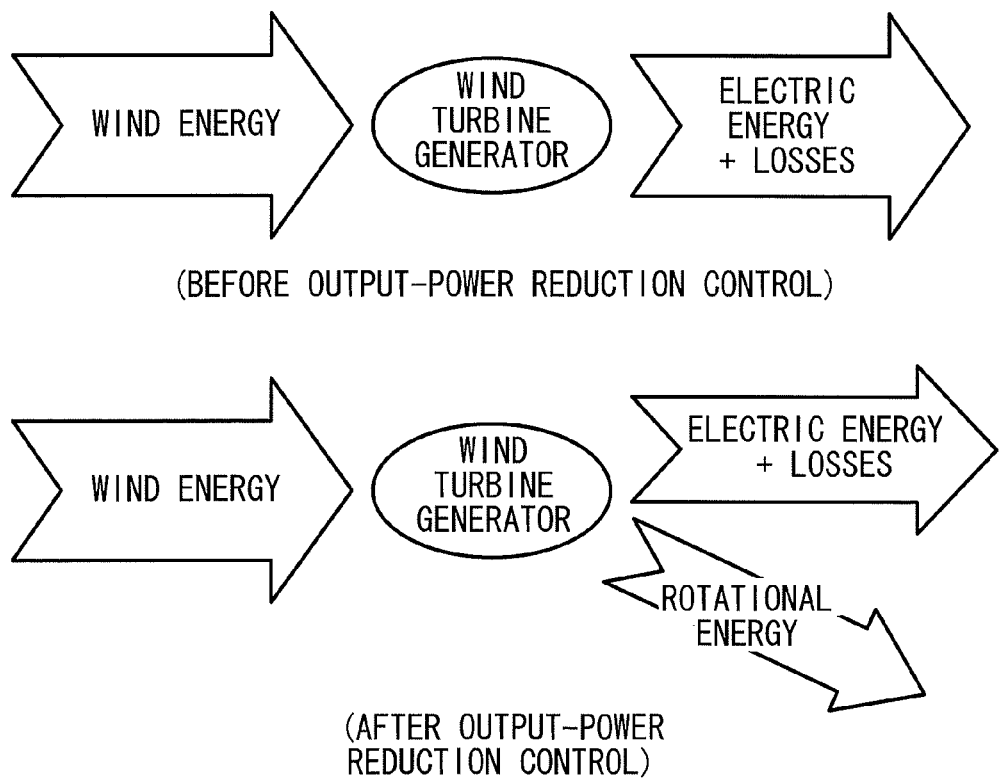
FIG. 5B shows conversion of wind energy performed by the wind turbine generator through the output-power reduction control according to this embodiment.

FIG. 5A shows conversion of wind energy performed by the wind turbine generator through the conventional output-power reduction control, and FIG. 5B shows conversion of wind energy performed by the wind turbine generator through the output-power reduction control according to this embodiment.

As shown in FIGS. 5A and 5B, in both the conventional output-power reduction control and the output-power reduction control of this embodiment, before the output-power reduction control is performed, the wind energy received by the blades 20 is converted into electric energy (electrical power) and losses, such as thermal energy, by the wind turbine generator 10.

Then, when the conventional output-power reduction control is performed, the wind energy received by the blades is converted by the wind turbine generators 10 into electric energy, losses, and rotational energy (inertial energy) that is obtained by increasing the rotational speed of the rotor 18;

however, part of the wind energy is wasted as wind energy when the pitch angles are controlled to be set to the feather side.

On the other hand, as shown in FIG. 5B, when the output-power reduction control of this embodiment is performed, the wind energy received by the blades is neither converted into rotational energy nor wasted as it is.

Note that the inertial energy stored through the output-power reduction control is converted into electrical power by the generator in cases where an event to cancel the output-power reduction control occurs, such as a case where the grid frequency recovers to a healthy value and a case where the output power of the wind turbine generator 10 is reduced because the wind speed drops.

On the other hand, if the total-output-power reduction value $\Delta P$ is not obtained only through the output-power reduction control of this embodiment, the pitch angles of the blades 20 are changed by a predetermined angle from full fine toward the feather side, and the operations of the wind turbine generators 10 are continued.

Furthermore, the wind-turbine-output-power-reduction-value calculating section 62A may add, to the output-power reduction control, number-of-generators selection control in which the number of wind turbine generators 10 whose output power is to be reduced is derived based on the total-output-power reduction value $\Delta P$, the wind-turbine-output-power reduction values $\Delta P_n$ are calculated for the derived number of wind turbine generators 10, and the derived number of wind turbine generators 10 are made to reduce the output power thereof and to increase the rotational speeds of the rotors 18 thereof.

According to the output-power reduction control to which the number-of-generators selection control has been added, if the total-output-power reduction value $\Delta P$ is large, the control for reducing the output power is performed for relatively more of the wind turbine generators 10. On the other hand, if the total-output-power reduction value $\Delta P$ is small, the control for reducing the output power is performed for relatively few of the wind turbine generators 10.

As an example specific process of the number-of-generators selection control, the wind-turbine-output-power-reduction-value calculating section 62A sorts the wind turbine generators 10 in descending order of the potentially-available inertial energy $Einer_n$.

Then, if the total-output-power reduction value $\Delta P$ is equal to or larger than a predetermined threshold, the wind-turbine-output-power-reduction-value calculating section 62A calculates the wind-turbine-output-power reduction values $\Delta P_n$ for the top 20 wind turbine generators 10, for example, so as to perform the output-power reduction control therefor. On the other hand, if the total-output-power reduction value $\Delta P$ is smaller than the predetermined threshold, the wind-turbine-output-power-reduction-value calculating section 62A calculates the wind-turbine-output-power reduction values $\Delta P_n$ for the top 10 wind turbine generators 10, for example, so as to perform the output-power reduction control therefor.

Therefore, with the number-of-generators selection control, since the output-power reduction control is not always performed for all the wind turbine generators, the output-power reduction control can be performed efficiently.

Furthermore, the wind-turbine-output-power-reduction-value calculating section 62A may add, to the output-power reduction control, wind-energy selection control in which a wind turbine generator 10 for which it is expected that the received wind energy will decrease is selected, the wind-turbine-output-power reduction value $\Delta P_n$ is calculated for the selected wind turbine generator 10, and the selected wind turbine generator 10 is made to reduce the output power thereof and increase the rotational speed of the rotor 18 thereof.

Note that the wind energy received by each wind turbine generator 10 is calculated based on a wind speed detected by an anemometer installed in the vicinity of the wind turbine generator 10.

Even when the output-power reduction control is performed for the wind turbine generator 10 for which it is expected that the received wind energy will decrease, an increase in the rotational speed of the rotor 18 thereof is smaller. Therefore, it is unlikely that the rotational speed of the rotor 18 will reach the rated rotational speed. Thus, with the wind-energy selection control, the wind energy wasted by the wind turbine generators 10 through the output-power reduction control can be better suppressed.

Note that a combination of the number-of-generators selection control and the wind-energy selection control may also be added to the output-power reduction control.

As described above, the wind-power-station control apparatus 54 of this embodiment is provided in the wind power station 50 (wind farm), which has a plurality of wind turbine generators 10. To reduce the electrical power supplied from the wind power station 50 to the utility grid, the wind-power-station control apparatus 54 performs, for a wind turbine generator 10 whose actual output electrical power is relatively small with respect to the maximum electrical power that can be output, among a plurality of wind turbine generators 10, control for reducing the output power thereof and increasing the rotational speed of the rotor 18 thereof.

Thus, even if control for reducing the output power is performed for the wind turbine generator 10, it is possible to suppress waste of the wind energy received by the blades and to increase the total annual amount of generated electrical power.

Furthermore, the wind-power-station control apparatus 54 of this embodiment calculates the potentially-available inertial energy $Einer_n$ for each of the wind turbine generators 10 and calculates the wind-turbine-output-power reduction value $\Delta P_n$ for each of the wind turbine generators 10 such that the output-power reduction value for the wind turbine generator 10 increases as the potentially-available inertial energy $Einer_n$ increases.

Thus, the wind-power-station control apparatus 54 can perform the control for reducing the output power of the wind turbine generator 10 with a higher degree of accuracy.

Furthermore, the wind-power-station control apparatus 54 of this embodiment calculates the wind-turbine-output-power reduction value $\Delta P_n$ for each of the wind turbine generators 10 by prorating the total-output-power reduction value $\Delta P$ based on the potentially-available inertial energy $Einer_n$ for the wind turbine generator 10. Therefore, the wind-turbine-output-power reduction value $\Delta P_n$ for each of the wind turbine generators 10 can be easily calculated.

Although the present invention has been described by referring to the above embodiment, the technical scope of the present invention is not limited to the scope described in the embodiment. Various modifications or improvements can be added to the embodiment without departing from the scope of the invention, and an embodiment to which those modifications or improvements have been added is also encompassed in the technical scope of the present invention.

For example, in the above-described embodiment, a description has been given of a case where the wind-power-station control apparatus 54 calculates the wind-turbine-output-power reduction values $\Delta P_n$ for the wind turbine generators 10 and sends them to the wind-turbine controllers 52 as output-power reduction commands. However, the present invention is not limited thereto, and each of the wind-turbine controllers 52 may calculate the wind-turbine-output-power reduction value $\Delta P_n$ for the corresponding wind turbine generator 10.

In this case, the configuration of the wind power station 50 is the same as that shown in FIG. 2, however, each of the wind-turbine controllers 52 can send and receive the operating information to and from the other wind-turbine controllers 52.

Each of the wind-turbine controllers 52 calculates the potentially-available inertial energy $Einer_n$ for the corresponding wind turbine generator 10 based on Formula (1).

Then, the wind-turbine controller 52 receives the operating information from the other wind-turbine controllers 52, also receives the total-output-power reduction value $\Delta P$ from the wind-power-station control apparatus 54, calculates the wind-turbine-output-power reduction value $\Delta P_n$ for the corresponding wind turbine generator 10 based on Formula (2), and performs the output-power reduction control for the corresponding wind turbine generator 10.

Furthermore, in the above-described embodiment, a description has been given of a case where the wind-power-station control apparatus 54 calculates the total-output-power reduction value $\Delta P$ for the wind power station 50 from the grid frequency. However, the present invention is not limited thereto, and the total-output-power reduction value $\Delta P$ for the wind power station 50 may be obtained directly from the interconnection point.

REFERENCE SIGNS LIST 10 wind turbine generator
18 rotor
20 blades
50 wind power station
52 wind turbine controller
54 wind-power-station control apparatus
62A wind-turbine-output-power-reduction-value calculating section
64 potentially-available-inertial-energy calculating section

The invention claimed is:

1. A control apparatus for a wind power station having a plurality of wind turbine generators, the control apparatus comprising:
an output-power-reduction value calculating unit configured to calculate an output-power reduction value when a reduction of electrical power supplied from the wind power station to a utility grid is requested, the output-power reduction value being a value for decreasing an output power of a wind turbine generator and for increasing a rotational speed of a rotor of the wind turbine generator, wherein
the output-power-reduction value calculating unit is configured to transmit the calculated output-power reduction value to, among the plurality of wind turbine generators, the wind turbine generator which has an actual output electrical power relatively small with respect to the maximum electrical power outputable by the wind turbine generator.

2. A control apparatus for a wind power station according to claim 1, further comprising:
a potentially-available-inertial-energy calculating unit for calculating potentially-available inertial energy, which is inertial energy storable by further increasing the rotational speed of the rotor, for each of the wind turbine generators based on operating information indicating an operational status of each of the wind turbine generators, wherein
the output-power-reduction-value calculating unit is configured to calculate the output-power reduction value for each of the wind turbine generators such that the output-power reduction value for each of the wind turbine generators increases as the corresponding potentially-available inertial energy calculated by the potentially-available-inertial-energy calculating unit increases.

3. A control apparatus for a wind power station according to claim 2, wherein the output-power-reduction-value calculating unit is configured to calculate the output-power reduction value for each of the wind turbine generators by prorating a reduction value for the electrical power supplied by said wind turbine generator to the utility grid, based on the corresponding potentially-available inertial energy calculated for said wind turbine generator.

4. A control apparatus for a wind power station according to claim 2, wherein the output-power-reduction-value calculating unit is configured to
derive wind turbine generators with output power to be reduced, based on the requested reduction of electrical power supplied to the utility grid,
calculate, for each of the derived wind turbine generators, the output-power reduction value such that the output-power reduction value increases as the corresponding potentially-available inertial energy increases, and
cause each of the derived wind turbine generators to reduce the output power thereof and to increase the rotational speed of the rotor thereof.

5. A control apparatus for a wind power station according to claim 2, wherein the output-power-reduction-value calculating unit is configured to
select, from the plurality of wind turbine generators, a wind turbine generator for which it is expected that received wind energy will decrease,
calculate the output-power reduction value for the selected wind turbine generator such that the output-power reduction value for the wind turbine generator increases as the corresponding potentially-available inertial energy increases, and
cause the selected wind turbine generator to reduce the output power thereof and increase the rotational speed of the rotor thereof.

6. A control method for a wind power station having a plurality of wind turbine generators, the control method comprising:
calculating an output-power reduction value, when a reduction of electrical power supplied from the wind power station to a utility grid is requested, the output-power reduction value being a value for decreasing an output power of a wind turbine generator and for increasing a rotational speed of a rotor of the wind turbine generator; and
transmitting the calculated output-power reduction value to, among the plurality of wind turbine generators, the wind turbine generator which has an actual output electrical power relatively small with respect to the maximum electrical power outputable by the wind turbine generator.

7. A control apparatus for a wind power station having a plurality of wind turbine generators, the control apparatus comprising:
an output-power-reduction value calculating unit configured to calculate an output-power reduction value when a reduction of electrical power supplied from the wind power station to a utility grid is requested, the output-power reduction value being a value for decreasing an output power of a wind turbine generator and for increasing a rotational speed of a rotor of the wind turbine generator, wherein the plurality of wind turbine generators includes a first wind turbine generator having a first rotor rotating at a first rotational speed and a second wind turbine generator having a second rotor rotating at a second rotational speed lower than the first rotational speed, and the output-power-reduction value calculating unit is configured to calculate a first output-power reduction value to be transmitted to the first wind turbine generator and a second output-power reduction value to be transmitted to the second wind turbine generator such that an amount of output power of the second wind turbine generator decreased in response to the second output-power reduction value is larger than an amount of output power of the first wind turbine generator decreased in response to the first output-power reduction value.

* * * * *